July 5, 1932.                W. H. GREEN                   1,866,030
                            MIXING APPARATUS
                  Original Filed Dec. 6, 1924    2 Sheets-Sheet  2
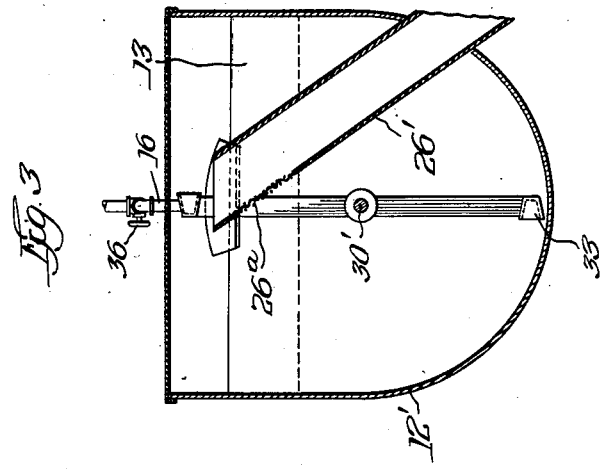
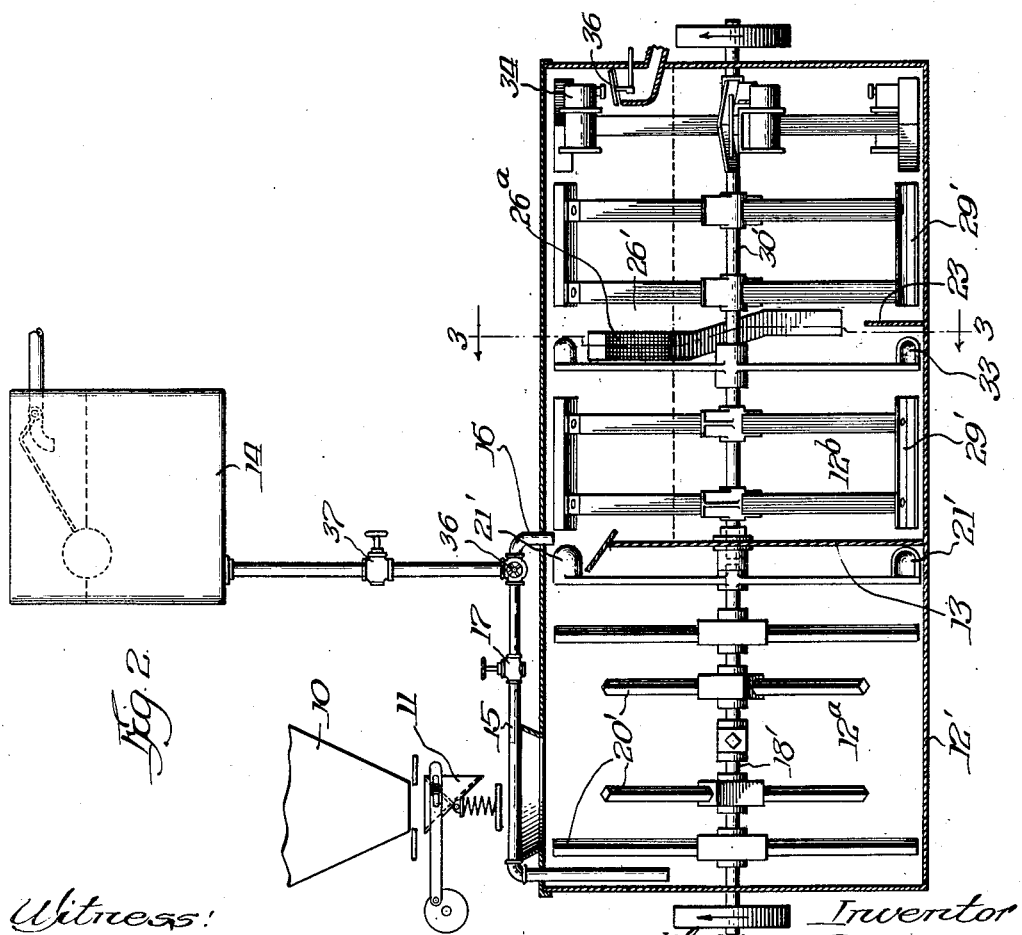

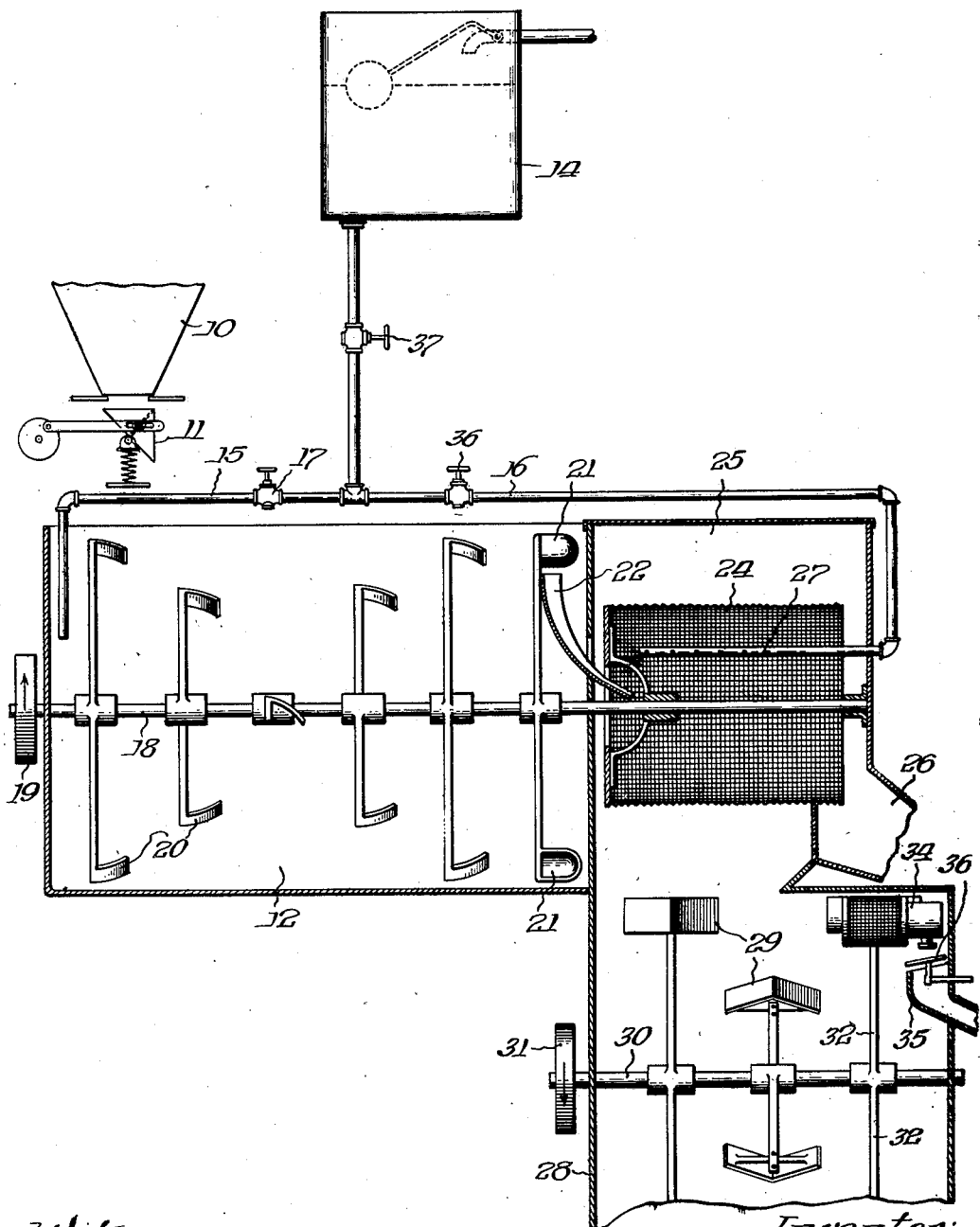

Patented July 5, 1932

1,866,030

UNITED STATES PATENT OFFICE

WALTER H. GREEN, OF CHICAGO, ILLINOIS, ASSIGNOR, BY MESNE ASSIGNMENTS, TO GENERAL ZEOLITE COMPANY, OF CHICAGO, ILLINOIS, A CORPORATION OF ILLINOIS

MIXING APPARATUS

Application filed December 6, 1924, Serial No. 754,278. Renewed May 2, 1930.

The commodity which is used most extensively and in greatest quantity in the treatment of water for removal of hardening or scale forming materials is ordinarily commercial lime. It is mixed with water in proper proportion to form milk of lime, which is added to the raw water in suitable quantity to induce the desired reactions. Of course, when combined with water to produce the milk of lime, the lime must have reached the hydroxide form. In the operation of the smaller plants it is usually feasible to buy the lime in the slaked form, and in a great many instances it is desirable to obtain it originally in that condition as it may be handled and measured with much greater convenience than when in the unslaked condition. In the operation of the larger plants, however, the items of storage space, cost of transportation, as well as original cost, aggregate very large sums, and the difference between the cost of the slaked and unslaked lime in those items represent a very large saving if the lime is purchased in the unslaked form.

Inasmuch as in the operation of a large plant a surprisingly large quantity of lime is used every hour, it follows that the conversion of the lime into the desired treating mixture must be accomplished very rapidly and uniformly and without interruptions. As suggested above, the handling of unslaked lime presents vastly greater difficulties than the handling of slaked lime. It does not have the same degree of uniformity of size as does the hydroxide and customarily consists of a mixture of particles ranging from dust or granules up to lumps weighing several pounds. It is likely to contain an appreciable amount of impurities, such as partly burned limestone, gravel and sand. Moreover, the conversion of the unslaked lime to the form of hydroxide involves an important element of time, and an entirely different proportioning of water than is present ultimately in the milk of lime suitable for the water treating mixture. Consequently, while it is desirable that the lime be purchased in the unslaked form, it is impossible to prepare the water treating material directly from the unslaked lime.

The general purpose of the present invention is to provide an apparatus which will be automatic, certain, rapid and continuous in operation, for preparing the treating material from unslaked lime.

One of the particular objects is the provision of such an apparatus which may be operated concomitantly with the water treating apparatus to prepare the treating material in the proper quantities and strengths to meet the current needs of the latter, without requiring the building up of a large reserve supply of the treating mixture, and without the danger of running short or requiring treatment of the raw water to be discontinued or slighted.

Another object is the provision of an apparatus which will accomplish these results and provide for the disposal of refuse or impurities which may be mixed with the unslaked lime.

The ultimate end attained by the invention is a very substantial reduction in the cost of the treating material which is made possible by the use of unslaked lime and by the simplified and automatic handling thereof in the production of the end product.

Other and further objects and accomplishments of the invention will be pointed out hereinafter, indicated in the appended claims or obvious to one skilled in the art upon an understanding of the present disclosure. For the purpose of this application, I have elected to present herein certain embodiments illustrative of the invention, same being shown in diagrammatic or schematic fashion, but which will impart to those skilled in the art the proper organization of means for attaining the results and advantages accomplished by the invention.

In the drawings forming a part of this specification;

Fig. 1 is a diagrammatic illustration in the nature of a longitudinal sectional elevation of apparatus embodying the invention;

Fig. 2 is a similar sectional elevation of another form of apparatus; and

Fig. 3 is a schematic transverse sectional elevation as seen on line 3—3 of Fig. 2.

Having in mind the purposes and use of the apparatus, the nature of the invention probably will be understood most readily by reference immediately to the illustrative embodiments. Let it be considered that the numeral 10 designates a hopper or chute through which the dry, unslaked lime is fed to a measuring apparatus, diagrammatically represented at 11, the same being in the nature of an automatic scale or the like, which is operable continuously to deliver a predetermined quantity of lime per unit of time, into a slaking tank 12. Various suitable forms of measuring apparatus 11 are known in the art. Suitable water supply apparatus is provided, designed to furnish a measured supply of water per unit of time, same being here illustrated by a constant-level tank 14, discharge from which is controlled by valve 37 and divided between a branch pipe 15 and a branch pipe 16 in the proportions determined by the adjustment of the valves 17 and 36. These are set so as to deliver into the tank 12 through the pipe 15, water in the proper proportion to hydrate the lime supplied by the means 11 at the most expeditious rate. Inasmuch as the speed of the reaction in the slaking process bears definite relation to the temperature, the supply of water through the pipe 15 is limited to such a rate that it will be warmed as quickly as possible by the heat resulting from the reaction, so as to maintain the reaction mixture at as high a temperature as possible while supplying an adequate quantity of water to hydrate the lime. By this proper original proportioning of the water to the lime, therefore, the slaking process may be carried on continuously and at a uniform and rapid rate. The rate at which the lime and the water may be supplied may be varied, of course, by variation in speed of operation of the supply mechanism 11 and the adjustment of valves 17, 36 and 37. The tank 12 is equipped with stirring apparatus operated by the shaft 18, which is driven by prime mover 19, and which apparatus includes stirrers 20. These are of such nature as to induce a gradual progressive feed of material in the tank 12 longitudinally of the latter away from the end at which the lime and water are delivered into it. The rate of feed is such as to allow the necessary time for hydration of the lime, so that the process is substantially complete by the time it reaches the delivery end of the tank, the water having been supplied in such a proportion that the resulting mixture at that point is of plastic consistency. On the shaft 18 at the delivery end of the tank are mounted rotary dippers 21 which travel through the mixture in the tank and deliver it therefrom at a rate corresponding to that at which the materials are fed into the tank. Said dippers deliver the slaked lime mixture onto a chute 22 which conveys it into a revolving screen drum 24 carried on the shaft 18 within a separating compartment 25. This screen is of such mesh that the hydrated lime may pass through it while foreign material such as gravel and chemically unchanged limestone are retained in the drum and delivered as tailings to the discharge chute 26. The straining of the hydrated lime through the screen 24 is contributed to by a spray of water supplied through the pipe 16 to the perforated conduit 27. The water here supplied is regulated by valve 36 in the proper quantity to form the milk of lime treating mixture of the desired strength. The water supplied from the conduit 27 and the hydrated lime strained through the screen 24 are delivered into the reservoir 28. This tank is equipped with agitating apparatus 29 driven by the shaft 30, whereby the treating mixture in it is maintained in the proper condition of uniform suspension, said agitating means being driven from the prime mover 31. On the arms 32 are mounted the delivery cups 34 which dip up the liquid mixture from the tank 28 and deliver it to the discharge funnel 35. The quantity of treating mixture delivered to the funnel 35 incident to the passage thereover of cups 34 is determined by the adjustment of a measuring device 36 which is movable to cover more or less of the funnel. This particular form of delivery and measuring mechanism is known in the art, being covered by my Patent No. 1,321,622. It determines the rate at which the treating mixture is supplied to the raw water. The capacity of the reservoir tank 28 is such as to take care of expected differentials between the rate of delivery of material from the slaking tank 12 and the rate of supply required for the treatment of raw water, and it also constitutes an equalizing pool for taking care of momentary variations in the proportions of water and lime supplied from the tank 12, as may be occasioned by variation in the proportion of refuse material contained in the unslaked lime. Overflow or shortage are avoided by regulation of the speed of shaft 18 and the lime and water supply. The screen compartment 25 and reservoir tank 28 are closed to air circulation as far as possible. This has the effect of preventing the formation of deposits of lime on the screen 24 and on the other parts of the apparatus with which the treating mixture comes into contact.

In the embodiment of Figs. 2 and 3 a somewhat different organization is employed. The supply apparatus 10 and 11 is utilized as in the first example to supply into the tank 12' a measured quantity of lime per unit of time, and likewise the water supply apparatus 14, 15, 16, 17, 36 and 37, is employed for supplying the liquid for the slaking and preparation of the treating mixture. The tank 12' has a slaking compartment 12ª in which the rotary beaters 20' are operated by shaft 18' to mix the lime and the water, said beaters having the effect also to move the mixture toward the partition 13. Adjacent this partition operate the dippers 21' which lift the wet slaked lime over the partition 13 into the reservoir 12ᵇ. In this chamber the additional water for forming the milk of lime mixture is supplied through the pipe 16, the mixture being completed by the operation of the agitators 29' carried on shaft 30'. The heavy matter which cannot be held in suspension by the liquid settles to the bottom of the reservoir 12ᵇ and works along the same until it comes to the baffle 23. Here it is retarded until picked up by the discharge dippers 33. These lift the refuse material and discharge it into a chute 26', through which it is conducted out of the tank, any of the treating mixture delivered into the chute being returned through the screen 26ª. In this fashion the delivery end of the tank is kept free from refuse material, so that the operation of the discharge cups 34 is unhampered. These operate to dispense the treating mixture in accordance with the adjustment of the measuring device 36, for apportionment to the water undergoing treatment. The tank is closed, so far as possible, to prevent free circulation of air in contact with the operating elements which come into contact with the treating mixture.

It will be understood that in the utilization of the apparatus, the speed of the lime supply mechanism 11 is regulated to feed the material at a rate adequate to take care of the raw water supplied for treatment, and the valve 17 is adjusted to deliver into the slaking tank an amount of water adequate to hydrate the lime and form a plastic mixture, but in quantities sufficiently limited to avoid cooling the reaction mixture. Incident to the agitation of the water and lime in the slaking tank, whereby the progress of the slaking is expedited, the material is moved progressively in the tank to its point of discharge, and is discharged therefrom at the same rate at which the materials are supplied. The rate of progressive feed and of discharge is controlled by the speed of the agitator shaft. As a result, there is a continuous uniform movement of the material through the slaking tank. By the time it is discharged from the slaking tank, the lime is hydrated and in condition to go readily into a state of suspension in the considerably larger proportion of water then supplied to it for forming the treating mixture. Incident to this dilution, the refuse material is separated out and discharged, thereby qualifying the apparatus for continuous and prolonged operation, it being unnecessary to stop it for the purpose of removing an accumulation of refuse. The treating mixture is kept in a state of continual agitation so that a uniform suspension of the lime is maintained, the treating mixture meanwhile being dispensed at a rate which is subject to variation in accordance with momentary variation in the rate of supply of raw water.

I claim:

1. In a water treating apparatus, a vessel, a solid conduit and a liquid conduit having access to the vessel, an agitator in the vessel, another vessel, a conveyor from the first vessel to the second vessel having an intake from the first vessel at a point removed from the place of access of the solid and liquid conduits and a discharge into the second vessel, a second liquid conduit into the second vessel having access thereto at the place of discharge of the conveyor, an agitator in said second vessel, a conveyor from the second vessel having an intake at a place removed from the place of discharge of the first mentioned conveyor, a screening means in the second vessel placed between the first and second conveyors and a discharge from said screening means.

2. In a water treating apparatus, a compartment adapted to receive and contain a liquid-solid mixture, agitating means therein, a solid conducting means and a liquid conducting means having access to the compartment, another compartment adapted to receive and contain a liquid-solid mixture, agitating means therein, conducting means for the mixture leading from the first mentioned compartment to the second mentioned compartment, and another liquid conducting means having access to the second mentioned compartment.

3. In a water treating apparatus, a compartment adapted to receive and contain a liquid-solid mixture, agitating means therein, a solid conducting means and a liquid conducting means having access to the compartment, another compartment adapted to receive and contain a liquid-solid mixture, agitating means therein, conducting means for the mixture leading from the first mentioned compartment to the second mentioned compartment, and another liquid conducting means having access to the second mentioned compartment, the first mentioned liquid conducting means being in heat transferring relationship with the first mentioned compartment.

4. In a water treating apparatus, a compartment adapted to receive and contain a liquid-solid mixture, agitating means therein, a solid conducting means and a liquid conducting means having access to the compartment, another compartment adapted to receive and contain a liquid-solid mixture, agitating means therein, conducting means for the mixture leading from the first mentioned compartment to the second mentioned compartment, and another liquid conducting means having access to the second mentioned compartment, the second mentioned compartment being enclosed so as to prevent the passage of air therethrough.

5. In a water treating apparatus, a compartment adapted to receive and contain a liquid-solid mixture, agitating means therein, a solid conducting means and a liquid conducting means having access to the compartment, another compartment adapted to receive and contain a liquid-solid mixture, agitating means therein, conducting means for the mixture leading from the first mentioned compartment to the second mentioned compartment, and another liquid conducting means having access to the second mentioned compartment, the first and second mentioned liquid conducting means being mutually adjustable.

6. In a water treating apparatus, a compartment adapted to receive and contain a liquid-solid mixture, agitating means therein, a solid conducting means and a liquid conducting means having access to the compartment, another compartment adapted to receive and contain a liquid-solid mixture, agitating means therein, conducting means for the mixture comprising rotary dipping cups leading from the first mentioned compartment to the second mentioned compartment, and another liquid conducting means having access to the second mentioned compartment.

7. In a water treating apparatus, a compartment adapted to receive and contain a liquid-solid mixture, agitating means therein, a solid conducting means and a liquid conducting means having access to the compartment, another compartment adapted to receive and contain a liquid-solid mixture, agitating means therein, conducting means for the mixture leading from the first mentioned compartment to the second mentioned compartment, and another liquid conducting means having access to the second mentioned compartment, the discharges of the second mentioned liquid conducting means and the mixture conducting means being closely adjacent so that the materials being discharged therefrom may readily commingle.

8. In a water treating apparatus, means adapted to receive and contain a liquid-solid mixture, means to cause agitation of the mixture therein, a solid conducting means and a liquid conducting means having access to said receiving and containing means, another means adapted to receive the liquid-solid mixture from said receiving and containing means, means to remove the mixture therefrom, conducting means for the mixture leading from the first mentioned receiving means to the second mentioned receiving means, another liquid conducting means having access to the second mentioned receiving means, and means for causing intermixture of the liquid and the mixture in the second mentioned receiving means.

In testimony whereof I have hereunto signed my name.

WALTER H. GREEN.

CERTIFICATE OF CORRECTION.

Patent No. 1,866,030.                                                                  July 5, 1932.

WALTER H. GREEN.

It is hereby certified that error appears in the printed specification of the above numbered patent requiring correction as follows: Page 1, line 4, for "ordinarily" read "ordinary"; page 2, lines 104 and 118, strike out the word "tank"; and that the said Letters Patent should be read with these corrections therein that the same may conform to the record of the case in the Patent Office.

Signed and sealed this 13th day of December, A. D. 1932.

M. J. Moore,
(Seal)                                    Acting Commissioner of Patents.